Dec. 4, 1951   T. C. SMITH ET AL   2,577,162
SOUND FILM DRIVE AND GUIDE

Filed April 16, 1946   3 Sheets-Sheet 1

THOMAS C. SMITH,
FREDERICK H. M. HART, WILLIAM A. FREER. INVENTORS
BY Pennie, Edmonds, Morton and Barrows ATTORNEYS

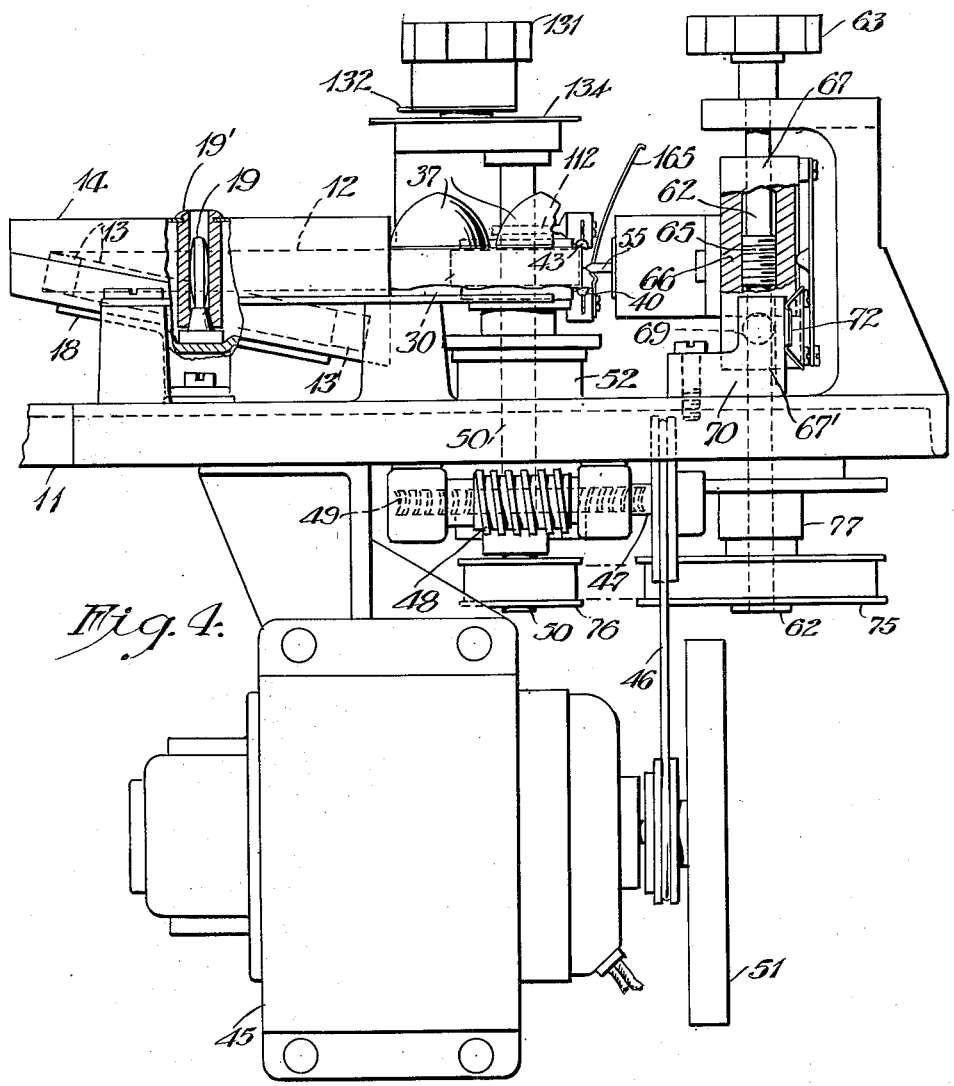

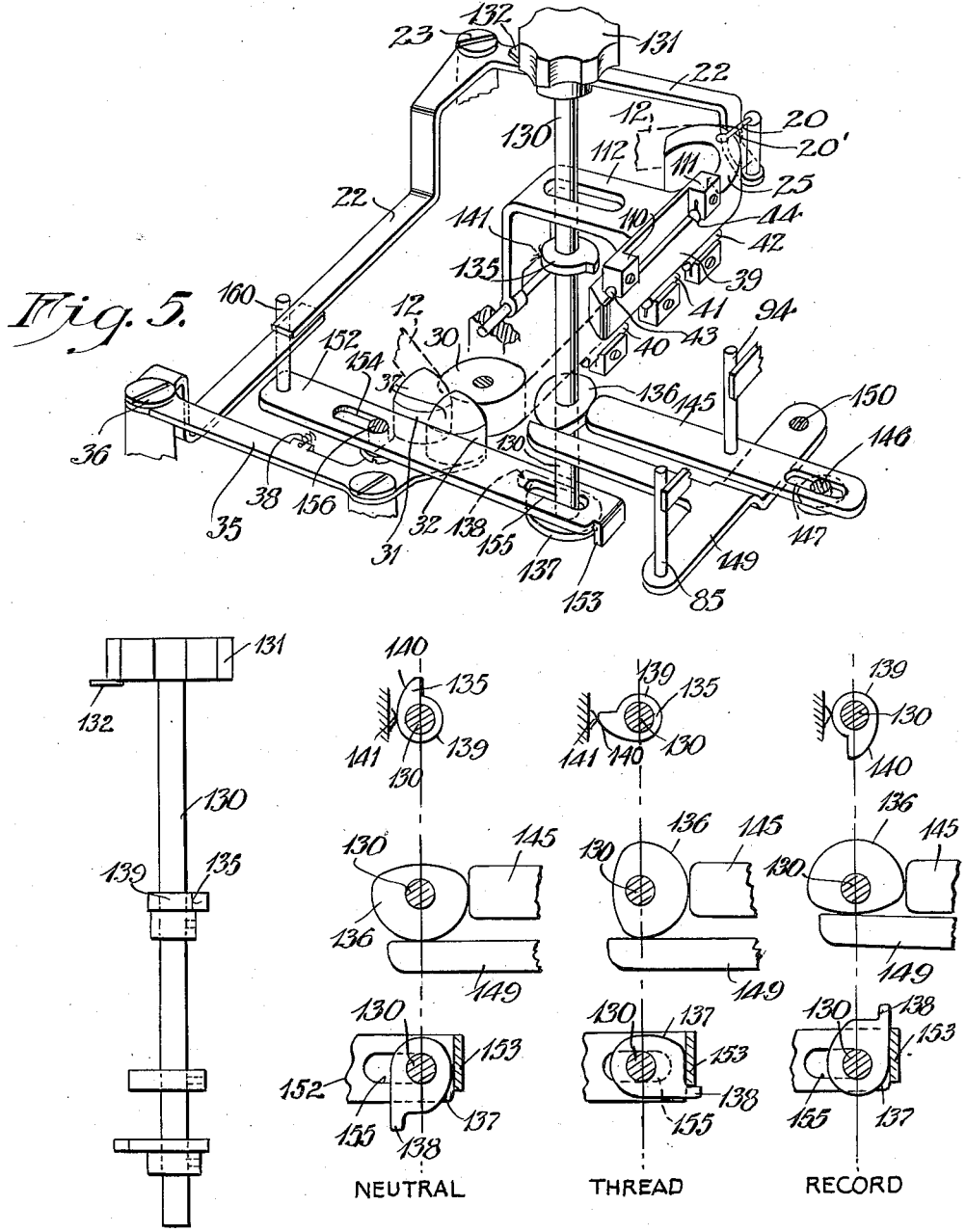

Patented Dec. 4, 1951

2,577,162

UNITED STATES PATENT OFFICE 2,577,162

SOUND FILM DRIVE AND GUIDE

Thomas C. Smith, Frederick H. M. Hart, and William A. Freer, Poughkeepsie, N. Y., assignors, by mesne assignments, to Recordgraph Corporation, a corporation of Delaware Application April 16, 1946, Serial No. 662,546

7 Claims. (Cl. 274—11)

1

This invention relates broadly to apparatus employing a longitudinally movable strip member which is continuously driven and restrainedly reguided during operation, as in a sound recording and reproducing apparatus utilizing a film strip carrier as a sound record medium, and as in motion picture projector apparatus of the continuously moving film type, and the like. More specifically, the invention relates to improvements in means for uniformly advancing a strip member past a conversion point and for effecting lateral restraint and guidance thereof adjacent said point, with provision for ready insertion and removal of the strip and an endless loop thereof.

In apparatus of the character referred to, arrangements heretofore employed for driving a film or other strip member and precisely guiding it at the location of recording and pick-up devices have made it necessary for the film to conform to a more or less tortuous path which, together with obstacles to its free maneuvering, has caused the operation of placing the film in working position to be an unduly awkward and time-consuming one. Moreover, when an endless loop having the major portion thereof coiled into roll form has been employed, the mounting operation has been further complicated by the necessarily skewed relation of the uncoiled portion of the loop, connecting inner and outer coils of the roll, to the body of the roll and by the tendency of the roll to uncoil.

For example, when arranged as an endless loop, the film cannot be mounted by a longitudinal threading operation but instead must chiefly be slid over the various driving and guide members in a lateral direction. In apparatus heretofore manufactured it has been necessary to perform several operations to prepare the apparatus to receive the film in this manner and considerable manual dexterity has been required to place the film in working relation to its engaging members. Also, in bending and sliding of the film around and over obstacles there has been danger of creasing or tearing the film and of marring its surface. Similarly, in removing the film from the apparatus there has been present the danger of damaging the record thereon.

The present invention avoids the above and other disadvantages of prior art devices by providing a simplified driving arrangement together with guide means having a displaceable element which may be positioned away from the film path to afford a clear space for mounting the film by a simple lateral movement thereof. Moreover, the invention provides means whereby all operations required to prepare the apparatus to receive a film loop and, in the case of sound apparatus, to condition the apparatus for recording or reproduction, are controlled by a single operating member.

It is an object of the invention to provide driving and guide means for a longitudinally driven strip adapted and arranged to facilitate the operation of positioning the strip in and out of engagement therewith.

It is another object to provide in apparatus employing a longitudinally driven film strip, such as sound recording and reproducing apparatus, a restraint for the strip comprising a guide member displaceable from a working position thereof to permit the ready mounting of the film on the apparatus.

Another object is to provide in apparatus of the above character single control means adapted to condition the apparatus for the ready mounting and demounting of an endless film loop thereon and for selectively positioning mechanical, optical or other recording and reproducing means relative to the film.

Another object is to provide in apparatus of the above character an arrangement of driving and guide means for an endless film strip loop adjustable to a condition whereby in mounting the loop on the apparatus a straight section thereof normally extending between a pair of direction-changing members along the film path and laterally guided at a location therebetween may be moved laterally of the strip to its working position while in engagement with the peripheries of said members.

Another object is to provide guide means for a longitudinally driven film strip adapted to secure accurate lateral guidance of the strip at a location at which a control mechanism is engaged with the edge thereof and actuated by passage of the strip.

A further object is to provide guide means for a longitudinally driven strip having adjustable wear-resistant guide members formed and positioned to cooperate with platen means in guiding the strip.

Other objects and advantages will become apparent as the description proceeds.

According to the general features of the invention as illustrated herein in its application to sound recording and reproducing apparatus utilizing as a record medium an endless film strip principally coiled into roll form, there is provided film advancing mechanism for continuously withdrawing the film from the innermost coil of the rotatably supported roll and returning it to the outermost coil, the roll rotating meanwhile. The film path includes a straight section extending between and tangent to the peripheries of a pair of direction-changing members one of which may be a driving sprocket or pulley for the film. In this straight section a platen provides support for the film in a normal direction for recording and reproducing purposes, and along the longitudinal edges of and slightly spaced from the platen there extend a pair of opposed sapphire guides providing lateral restraint in two directions for the film. One of these guides is stationary, while the other is pivoted about an axis parallel to the film edge and lying without the plane of the film so that by rotating this movable guide about its axis, by a cam mechanism, a clear space is provided for sliding the film laterally over the platen. Selective rotation of the cam-shaft which controls actuation of the movable guide also controls the positioning of recording and reproducing styli in and out of engagement with the film. A number of operating positions of the cam shaft are provided in one of which, the position for threading or removing the film, both recording and reproducing styli are positioned away from the film path while the movable guide is swung to its position clear of the platen. Other positions of the same cam shaft condition the apparatus for recording, reproduction and other functions.

When several sound tracks are recorded on a single film strip, traverse of the recording and reproducing styli across the film may be controlled by a mechanism actuated by the passage of notches in an edge of the film. Such mechanism is disclosed in the co-pending application of E. L. Steed, Serial No. 641,558 filed January 16, 1946, now Patent No. 2,560,395, issued July 10, 1951, assigned to the assignees of the present invention, and one of the guide members above referred to is preferably formed to accommodate this mechanism at the location where precise lateral guidance of the film is required for its proper operation.

That portion of the endless film loop which is coiled into roll form may be supported and confined within an improved type of magazine and attached to the apparatus by an improved mounting plate therefor, both disclosed in the copending application of one of the present applicants, Frederick H. M. Hart, Serial No. 644,489 filed January 31, 1946, now Patent No. 2,546,124, issued March 20, 1951, assigned to the assignees of the present invention. The invention will be better understood upon consideration of the following description, taken in connection with the appended drawings in which:

Fig. 4 is a front elevational view of the apparatus of Fig. 1;

Fig. 5 is a perspective drawing showing a portion of the mechanism of Fig. 1;

Fig. 6 is an elevation of a camshaft assembly;

Figure 1:
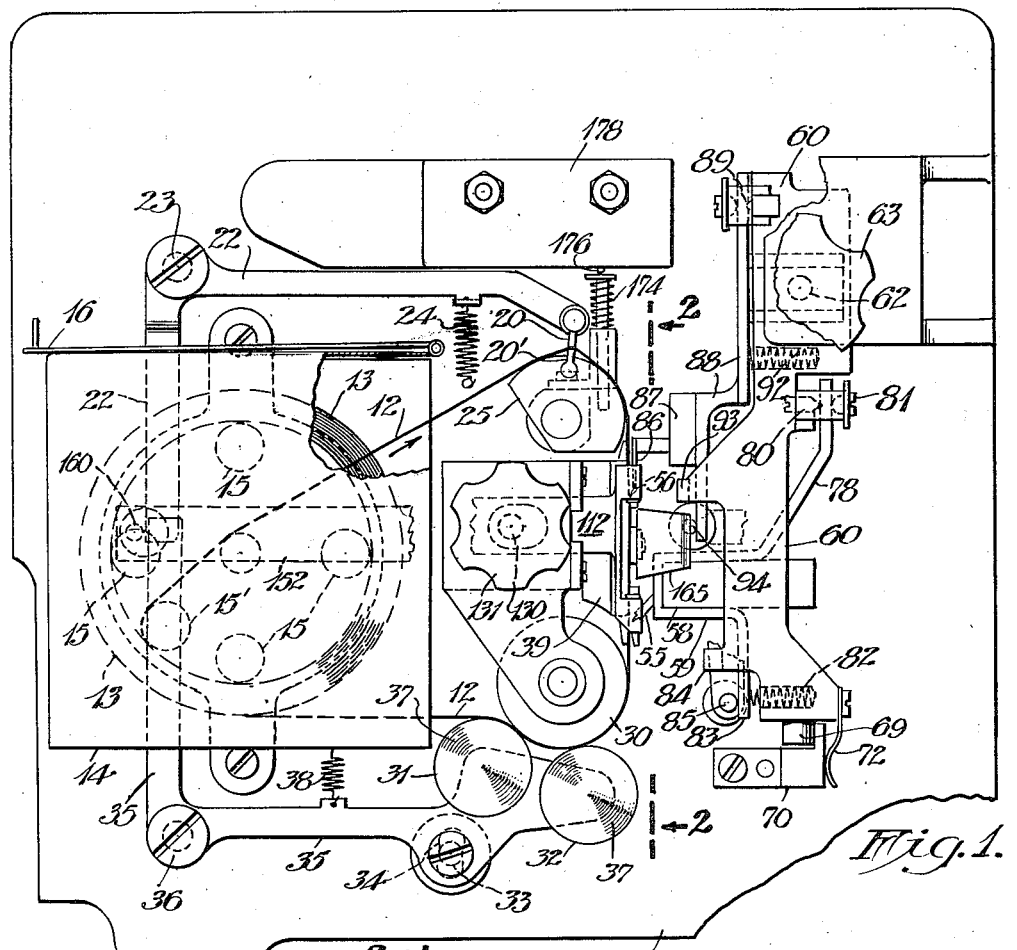
Fig. 1 is a plan view of sound recording and reproducing apparatus employing a film strip as a record medium and embodying the film driving and guide means of the invention.
Figures 2, 3:
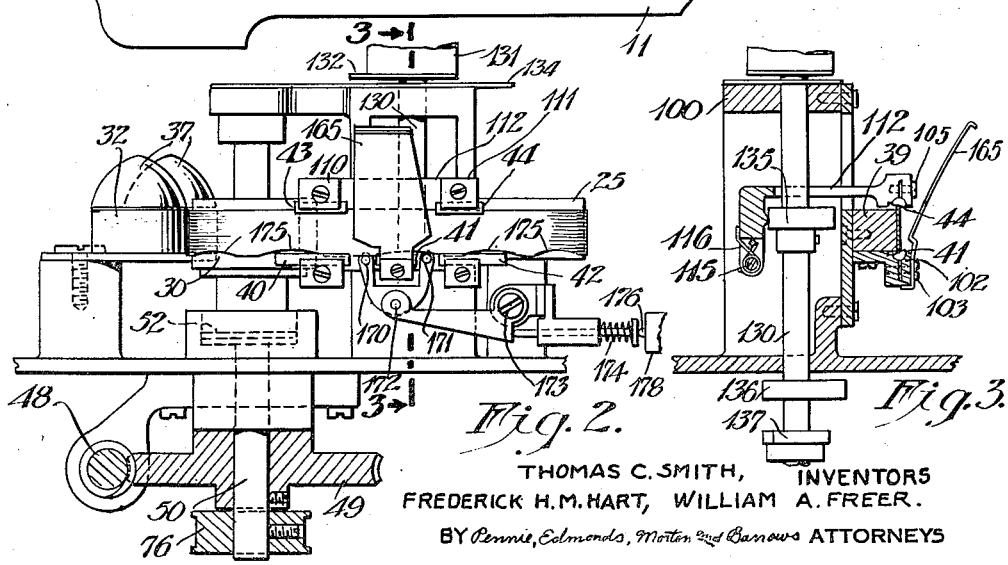
Fig. 2 is a fractional elevational view of the apparatus of Fig. 1, shown as a section along the line 2—2 of that figure.
Fig. 3 is a fractional elevational view of the apparatus of Fig. 1, shown as a section along the line 3—3 of that figure.

Figs. 7 (a), (b) and (c) are diagrammatic drawings illustrating the operation of the cams in the assembly of Fig. 6;

Fig. 8 is an enlarged detail of Fig. 3, illustrating two positions of the movable film guide shown therein;

Fig. 9 is a plan view of the cam shaft control knob of Fig. 6, together with cooperative indicia-bearing means.

In the drawings numeral 11 is applied to a panel or supporting member of a sound recording and reproducing device employing, as a record medium, a flexible strip 12, such as a strip of unsensitized cellulose acetate film, on which a plurality of parallel longitudinal sound tracks may be mechanically produced by recording means to be described. Film 12 is arranged as an endless loop having the major portion thereof coiled into a roll 13 confined in a magazine 14 and rotatably supported therein on a plurality of rollers 15 which engage the innermost coil of the roll. Magazine 14 may be of the demountable type fully disclosed in the aforementioned Patent No. 2,546,124, and may comprise separable front and rear sections to facilitate the placing of the film roll on rollers 15, as therein described.

The magazine, which has an opening for the exit and entrance of the film, closed by cover 16, is shown as detachably secured to a mounting plate 18, attached to panel 11, by the engagement of a friction stud 19, extending from the mounting plate, and a hollow post 19' carried by the magazine. Mounting plate 18 is shown as of the type, likewise disclosed in Patent No. 2,546,124, which has an inclined surface on which magazine 14 seats and by which the magazine and film roll are located in suitable angular relation to panel 11 to permit driving engagement of the film with rotative means mounted thereon.

The film, as positioned for driving, leaves the innermost coil of roll 13 at a rotatable guide member 15', which may be similar to mounting rollers 15, in a direction making an acute angle with the plane of the roll face, and passes between an outer film wiper 20 and an inner film wiper 20', both of which may be of cloth or similar soft material, to remove dust and foreign particles from the film surfaces. Film wiper 20 is mounted on a bent lever or arm 22 pivoted at 23 and is urged toward contact with the film by a spring 24. Film wiper 20' is carried by a stationary post 25 having a highly polished cylindrical surface which serves to change the direction of the film path and with which the film is in contact over a substantial arc. Spaced from post 25 in the direction of film travel is a driving roller 30, preferably having a surface layer of resilient friction material such as rubber, with the periphery of which the film is in engagement before returning to the outermost coil of roll 13 in the magazine.

It will be apparent in the figures and from the foregoing description that the path of the film external to the magazine lies substantially in a plane perpendicular to the axis of roller 30 and of post 25. To insure intimate contact of the film with the driving roller, with sufficient friction for driving purposes when unperforated film and a smooth surfaced roller are used, as in the illustrated form of the invention, a pair of rotatably mounted pressure rollers 31, 32 is provided, supported in spaced relation on a bent lever 35 pivoted to the panel at 36. Lever 35 has an angular displacement limited by pin 33 and slot 34. Rollers 31, 32 may be provided with smooth dome-shaped covers, as cover 37, serving as deflectors in mounting the film. A spring 38, attached to lever 35, normally causes rollers 31, 32 to hold the film against the periphery of drive roller 30 under selected pressure.

Between direction-changing post 25 and drive roller 30, the film passes over a platen 39 having a polished surface along opposite edges of which are located lateral film guide means 40, 41, 42 and 43, 44, respectively, which, with platen 39 form a gate for the film, best seen in Fig. 5, and which is referred to more particularly hereinafter. Drive roller 30 is rotated by motor 45, connected to a suitable source, by way of belt drive 46 to shaft 47 on which is mounted a worm 48 in engagement with a worm wheel 49 mounted on shaft 50 to which roller 30 is secured. A flywheel 51 is mounted on the motor shaft to aid in securing constant speed operation of the film and a clutch 52 may be interposed between independently mounted sections of shaft 50 and controlled by means (not shown) for starting and stopping the film, in addition to or in connection with a motor control.

By the operation of motor 45 and roller 30 driven thereby, the film is continuously withdrawn from the innermost coil of roll 13 and returned to the outermost coil, the roll rotating on supporting rollers 15 as the film advances. The skewed relation of the roll to the uncoiled section of the endless loop is clearly apparent in the figures. The path of the film external to the magazine is as simple as is possible, the only direction-changing members engaging the film being post 25, drive roller 30 and pressure roller 32, the last named member being positionable out of engagement with the film for threading purposes, as will be explained. The common tangent to the cylindrical peripheries of members 25 and 30, which are preferably unflanged and over which the film may be slid in an axial direction, defines a straight section of the film loop where recording and reproducing means cooperate with the film. The only restraints against lateral movement of the film at this section are the guides 40, 41, 42 and 43, 44. Restraint against deflection normally of the surface of the film, in one direction, is furnished by platen 39 over which the film slides longitudinally.

At the location of platen 39 a recording stylus 55 or a reproducing stylus 56 may selectively be placed in contact with the film, by means to be described, for recording or playing back a record, respectively. In the recording process a sound track is cut or embossed in the film by recording stylus 55, actuated by a recording head 58 which includes conventional means for translating a varying electrical potential, derived from a microphone and associated amplifier (not shown) and characteristic of the sound impulses to be recorded, into a vibration of the stylus. Recording head 58 is mounted by support means 59 on a carriage 60 which is mounted for traverse across the film. This motion of the carriage is shown as controlled by a knob 63 by means of which shaft 62 and a lead screw 65 formed thereon may be rotated, the lead screw being in threaded engagement with a nut 66 or threaded portion of the carriage. For its support and guidance the carriage is provided at one end with a pair of axially spaced bearings 67, 67' slidable on shaft 62 and at the other end with a pin 69, adapted to engage a slideway on a post 70 projecting from panel 11 and held in contact with the post by a leaf spring 72. In addition to the manual traversing of carriage 60 provided for by rotation of knob 63, automatic operation of the carriage controlled by passage of the film, as will be explained, may be provided by a driving connection between shaft 62 and drive shaft 50, including pulleys 75 and 76, respectively secured to the two shafts, a connecting belt and a clutch 77.

The means 59 for supporting recording head 58 on carriage 60 includes a bent arm 78 having at an end thereof a laterally extending indentation adapted to receive a knife edge 80 mounted on the carriage, the head being thereby pivoted about said knife edge. Disengagement of the arm and knife edge is prevented by clamping means 81. Head 58 is biased toward displacement in a clockwise direction about knife edge 80 by a spring 82 engaging an extension 83 of arm 78. Rotation about the knife edge is limited by engagement of member 83 with a stationary stop 84 which defines the recording position of the head and stylus 55 carried thereby. In this recording position stylus 55, when suitably actuated, is adapted to form a sound track in the film, as by vibrating laterally of the direction of travel thereof. For displacing head 58 and stylus 55 away from this operating position, the head may be rotated to a limited extent about knife edge 80 by rectilinear displacement of a pin 85 adapted to engage extension member 83 of the recording head supporting structure, actuation of this pin being controlled by cam means to be described.

The reproducing or play-back stylus 56 is operatively connected through a leaf spring 86 to a reproducing head 87 comprising conventional element adapted to translate vibration of stylus 55, for example lateral vibration in the case of a laterally cut record, into a variable electrical potential. This potential may then be amplified by conventional amplifying means and supplied to a loud speaker. The invention is not concerned with the design of the amplifier or loud speaker used, or with their connecting circuits, and accordingly these features are not illustrated herein. The supporting structure for reproducing head 87 includes a bent arm 88 having a laterally extending indentation adapted to cooperate with a knife edge 89 supported by carriage 60, for pivoting the reproducing head and stylus about said knife edge, and clamping means are provided to prevent disengagement of the arm and knife edge. Near its center, arm 88 is engaged by a spring 92 to bias the head and stylus toward rotation in a clockwise direction about knife edge 89 to bring the stylus to its operating position, defined by the engagement of member 90 with a stop 93. For displacing head 87 and stylus 56 away from this operating position in which the stylus is adapted to follow a sound track in the film, a pin 94 is provided, displaceable by the cam means previously referred to in connection with recording head 58 and which is described in detail hereinafter. An indicator (not shown) may be provided to show the lateral position of the recording and reproducing styli relative to the film and may be graduated in terms of sound track numbers.

Returning, now, to a more detailed consideration of the film gate intermediate direction-changing post 25 and drive roller 30, comprising platen 39 and the lateral guide members associated therewith, it will be seen, more clearly in Figs. 2, 3 and 8, that the width of the platen face is slightly less than that of the film and that the three stationary guide members 40, 41, 42 are slightly spaced from the platen edge, as are the movable guide members 43, 44 when in contact with the film edge. These guide members are preferably formed from cylindrical rods of wear-resistant material, such as artificial sapphire, by grinding a flat, longitudinally-extending surface on each, constituting the film-engaging surface of the guide. So that the angular positions of these flats on guide members 40, 41, 42 may be adjustable, relative to the face of the platen and so that the guides may easily be replaced if damaged, the projecting portions of bracket 100 carrying the guides are each formed with a cylindrical recess 102, having a peripheral arc of more than 180 degrees, into which a guide fits and is held by clamping means 103, comprising a slot and clamping screw. The normal angular position of members 40, 41, 42 is such that their flat surfaces are inclined inwardly over the platen at a slight common angle.

Movable guide members 43, 44 extending along the opposite edge of the platen face are similar to members 40, 41, 42 as to material and section and are removably and adjustably clamped by clamping means 105 in cylindrical recesses in projecting portions 110, 111, respectively, of a swinging arm 112. The end stationary guides 40 and 42 are preferably somewhat longer than the central stationary guide 41 and are axially spaced therefrom to form a pair of gaps in the film-guiding means in which members of a film-actuated mechanism, later to be described, are positioned. Axially spaced movable guides 43 and 44 are positioned opposite guides 40 and 42, respectively.

Arm 112 extends in two directions at right angles to one another and is pivoted at 115 to bracket 100 about an axis parallel to the longitudinal axis of platen 39, and to the direction of film advancement thereover, and displaced from the plane of the face of the platen. Arm 112 may be resiliently biased toward rotation in a clockwise direction about pivot 115, as by torsion spring 116, to cause engagement of members 43, 44 with one edge of a film strip and thereby maintain the opposite edge of the film in engagement with members 40, 41, 42. If the apparatus is always to be used in a suitable position spring 116 may be omitted and gravity relied upon to supply the bias for arm 112.

Members 43, 44 are normally adjusted, as to the angular position of the flats thereon, so that when engaged with a film strip these flats are inclined inwardly toward the platen in symmetrical relation to the flats on the opposite guide members. The upper longitudinal edges of the two opposed flat lateral guide surfaces are therefore spaced at a distance less than the width of the film. The two sets of guides thus tend to hold a section of film already positioned between them in surface engagement with the platen. However, in their working positions, an obstacle is presented to the introduction of a film between the guides by a simple movement either laterally or normally, relative to the platen face. The displacement of the movable guide means of the invention from its working position, seen, for example, as the full line position in Fig. 8, to a position in which the guide means is clear of, i. e. not intersected by, the plane of the platen face, seen in the dashed line position of Fig. 8, permits insertion or removal of the film by a movement laterally of the platen and in the plane of the face thereof, without encountering any obstacle.

The disclosed apparatus is adapted selectively to be placed in condition permitting the performance of any of four operations, namely; (1) the threading or the removal of the film, (2) the recording of sound impulses, (3) the reproduction or playing-back of a record and (4) the driving of the film without either making or reproducing a record. To this end there is provided a camshaft 130 mounting at its outer end an operating knob 131 bearing an index 132 readable on angularly spaced positional markings 133 (Fig. 9) stationary on a member 134, these markings corresponding respectively to the four operating conditions referred to above. The four positions of the camshaft are designated on member 134 as, "Thd." (thread), "Rec." (record), "Play" (play-back) and "Neu." (neutral), the last named position corresponding to the condition of the apparatus in which the film may be driven idly without the performance of the recording or reproducing function. Detent means of any suitable type (not illustrated) may be provided to define the several operating positions of the camshaft.

The camshaft assembly and the members actuated by rotation thereof are best seen in Figs. 5 and 6. Camshaft 130 mounts three flat cams 135, 136 and 137, the forms and relative angular positions of which are seen in Figs. 7 (a), 7 (b) and 7 (c), as well as in Fig. 5. Cam 135 is adapted to actuate arm 112 to cause rotation of the arm about pivot 115 for moving guides 43, 44 carried thereby to and from their working positions in contact with the film edge. The cam contour comprises a circular arc 139 concentric with the camshaft determining a dwell of arm 112 extending over approximately 270 degrees and a sharply rising portion 140 extending over the remaining 90 degrees. Cam 135 operates on a button 141 carried by arm 112 at a location slightly removed from pivot 115, the relationship being such that in operation, rise 140 in the cam contour causes arm 112 to be rotated against the opposition of spring 116, or of gravity, to the position in which guide members 43, 44 and the portions of arm 112 mounting these members are clear of the plane of the face of platen 39 and the way is clear to the sliding of the film laterally over the platen. When cam shaft 130 is rotated to any position in which button 141 lies along a radius intersecting the dwell arc 139 of cam 135, arm 112 is free to rotate under the influence of spring 116, or of gravity, to a position bringing guide members 43, 44 in contact with the film edge or the edge of the platen if no film is in place.

Cam 136 has a contour providing a position of minimum displacement of its follower, with a rise in either direction therefrom through approximately 90 degrees to a constant radius portion extending over approximately 180 degrees which allows a follower to dwell throughout this latter arc in a position of maximum displacement, radially of the cam. Cam 136, located on the under side of panel 11, has two followers, namely, flat bar 145 slidable longitudinally while guided by a pin 146 positioned within a slot 147 in the bar and by other guide means, not shown, and a three armed lever 149 pivoted at 150 about an axis parallel to the camshaft axis. The respective points of contact of bar 145 and lever 149 with the periphery of cam 135 are angularly spaced at 90 degrees. Bar 145 carries pin 94 which extends with suitable clearance through a hole in panel 11 and is adapted to rotate reproducing head 87 about knife edge 89 by engagement with extension arm 83 of the reproducing head support means, as has been previously noted. Lever 149 carries pin 85, likewise previously referred to, extending through a hole in the panel and adapted to rotate recording head 58 about knife edge 80 by engagement with extension arm 83 of the recording head support means.

Cam 137 has a contour comprising a circular arc of minimum radius permitting the cam follower to dwell in an undisplaced position throughout a rotation of the camshaft of approximately 180 degrees, with a rise including a toothlike projection 138, which also serves as stop to rotation of the camshaft, taking up the remaining 180 degrees. The follower for cam 137 is a flat bar 152 having a downwardly bent end portion 153 adapted to engage the periphery of the cam. For the guidance of bar 152 there are provided slots 154 and 155 therein, surrounding pin 156 and camshaft 130, respectively. Bar 152 carries a pin 160 extending through a hole in panel 11, which, upon displacement toward the right, as seen in Fig. 5, is adapted to engage and to displace bent levers 22 and 35, previously referred to, pivoted to bosses on panel 11 at 23 and 36, respectively. Lever 22 carries film wiper member 20, which is normally pressed against the film by spring 24 and which is disengaged therefrom by the operation of cam 137.

Figs. 7 (a), 7 (b) and 7 (c) illustrate the positions of the cams and their followers in the "neutral," "thread" and "record" positions, respectively, of the camshaft while in the perspective showing of Fig. 5 these members appear in the "play-back" position. Considering first the condition of the apparatus illustrated in Fig. 7 (b), that is with camshaft 130 in the "thread" position, rise 140 in the contour of cam 135, by engagement with button 141, holds arm 112 at the left-hand limit of its excursion, represented by the dashed line position of Fig. 8, in which guides 43, 44 and the projecting portions of arm 112 carrying these guides are entirely without the plane of the face of platen 39. The displacement of arm 112 under the influence of cam 135 is best seen in Fig. 8, wherein the normal position of the arm with the sapphire guide members in contact with the film edge is shown in full lines and the displaced position of the arm in the "thread" position, corresponding to the angular position of cam 135 seen in Fig. 7 (b), is shown in dashed lines.

The position of cam 136 in Fig. 7 (b), that is in the "thread" position, is such that follower bar 145 experiences a maximum displacement toward the right, thereby causing pin 94 carried by the bar to displace reproducer head 87 and hold reproducing stylus 56 clear of the working position of the film. In the position of Fig. 7 (b) the end of the cam-contacting arm of lever 149 is also displaced from its normal position, downwardly, as seen in the figure. This causes a rotation of the lever about its pivot 150 and the displacement of pin 85, carried by the lever, to lift the recording head 58 and hold recording stylus 55 clear of the film location. As to cam 137, the angular position of this cam as seen in Fig. 7 (b) is such as to displace follower bar 152 to the right and thus cause pin 160, carried thereby, to hold levers 22 and 35 in positions which respectively maintain film wiper 20 and pressure rollers 31 and 32 clear of the film path.

The apparatus may thus be conditioned for the reception or removal of the record film under the control of a single operating member, knob 131. In the mounting of the film, with camshaft 130 in the "thread" position magazine 14 containing a film roll 13 is first seated on mounting plate 18 by the engagement of hollow post 19', carried by the magazine, with friction stud 19 carried by the mounting plate and subsequent movement of the magazine in the direction of the pin axis. With the rear wall of the magazine in contact with the inclined surface of the mounting plate, the film roll is in a suitable angular position for the engagement of a portion of the film, extended externally of the magazine, with the driving and guiding members of the apparatus. Since direction-changing post 25 and driving roll 30 present no obstructions to the sliding of this portion of the film thereover while extending therebetween in the common tangent plane thereto, and since the lateral obstruction presented, in their working positions, by the movable film guides and supporting members has been removed by the actuation of arm 112 by cam 135, the film section between post 25 and roll 30 may be slid substantially in said tangent plane until stopped by film guides 40, 41, 42. To prevent the film section between post and driving roll becoming caught on other members of the apparatus, notably the styli, as it is placed in working position, a curved flexible guard 165 is provided.

The film having been placed in the apparatus, camshaft 130 may be operated to the "record" position by rotation of knob 131 to bring the several cams and their followers into the relative positions seen in Fig. 7 (c). Without detailed explanation it will be obvious from inspection of the positions of the cams in this figure that cam 135 has allowed arm 112 to rotate in a clockwise direction about pivot 115, as seen in Fig. 5, and bring guides 43, 44 into contact with the film. The film is thereby guided laterally in two directions by the opposed guide members. The changed angular position of cam 136, by the operation of lever 149, has caused recording stylus 55 to be positioned in contact with the film, while the change of position of cam 137 has caused film wiper 20 and pressure rollers 31, 32 likewise to be positioned in contact with the film. Rotation of drive shaft 50 and drive roller 30 mounted thereon will, therefore, cause the advancement of the film in a longitudinal direction, and the vibration of stylus 55 responsive to sound impulses acting through the recording head 58 will cause a sound track to be formed in the film.

For playing back the record, camshaft 130 may be operated, by means of knob 131, to the "play-back" position, illustrated in Fig. 5. In this position sapphire guides 43, 44 are in contact with the film edge as in the "record" position, and film wiper 20 and pressure rollers 31, 32 are in surface engagement with the film. The recording stylus 55 is held out of contact with the film by the operation of cam 136, lever 149, pin 85 and extension member 83, while the reproducing or play-back stylus resiliently supported on leaf spring 86 has entered a sound track, assuming carriage 60 to be suitably aligned with the film for engagement of this sort, by the operation of cam 136, follower 145, pin 94 and member 90 of the reproducing head support.

The relative positions of the several cams and their followers in the "neutral" position of the camshaft are shown in Fig. 7 (a). Arm 112 is positioned to maintain guides 43, 44 in contact with the film edge, while cam 136 is positioned to hold both the recording and the reproducing styli out of contact with the film, as will be obvious from consideration of the portions of the cam contour active in actuating bar 145 and lever 149, respectively. Film wiper 20 and pressure rollers 31, 32 are all in contact with the film surface. The film may thus be run idly and the carriage traversed across the film without contact of the styli therewith.

In order to cause automatic shifting of the carriage mounting the recording and reproducing sound heads, to a new position at the completion of the recording or playing of a complete sound track, i. e. once during each revolution of the film loop, means controlled by the travel of the film are provided including a mechanism more clearly seen in Fig. 2, which is actuated by the passage of a series of notches in the film edge. This mechanism is fully disclosed in the aforementioned copending application of E. L. Steed, Serial No. 641,558. The details of said mechanism are shown in the present application only insofar as they are of interest in connection with the film guides. It will be seen that there is provided a pair of pins 170, 171 preferably of wear-resistant material similar to that of the film guides, mounted on means pivoted about two axes 172, 173 and resiliently urged against the edge of the film by spring 174. One of the pins is positioned in the gap between guides 40 and 41 and the other of the pins in the gap between guides 41 and 42, guide 41 being the control member best seen in Fig. 5. Passage of a series of notches 175 in the film edge engaged by pins 170, 171 suitably spaced relative to the pin spacing, causes rocking of the mounting means about pivot 172 and sustained displacement about pivot 173, and thereby actuates plunger 176 of a micro-switch 178 which is adapted to control the movement of the carriage through suitable means, not shown. By the axial spacing of stationary guides 40, 41, 42 there is thus provided a plurality of positions where lateral displacement of an edge of the film is substantially entirely prevented and yet where members of a mechanism actuated by passage of the film may be located in contact with said edge.

There has been disclosed herein mechanism having application to driving and guide means for a strip member of any material and with which recording, reproducing, control, and other means of a mechanical, electrical or optical nature may cooperate. Since various modifications may obviously be made within the spirit of the invention, the present disclosure is to be considered as illustrative only and not as limiting the scope of the invention, which is defined by the appended claims.

We claim:

1. In sound recording and reproducing apparatus a record medium in strip form, means for longitudinally advancing said strip including means causing a section of the strip at a selected location to advance in a plane, a stylus positionable in and out of engagement with said strip at said location, a stationary guide adapted to engage an edge of the strip and extending longitudinally thereof at said location, an opposed movable guide spring biased to engage the opposite edge of the strip at said location, and control means operable to position said stylus to said disengaged position and simultaneously to displace said movable guide to a position avoiding intersection with said plane, thereby to permit displacement of the strip relative to said stationary guide by lateral movement substantially within said plane, said control means including a rotatable camshaft and cam means carried thereby operatively connected to actuate said stylus and guide.

2. In sound recording and reproducing apparatus, an endless loop of a record medium in strip form, means for longitudinally advancing the strip, means determining a planar section of the advanced strip, means normally furnishing lateral restraint of the strip in two directions at said section comprising a pair of opposed guides normally extending along opposite strip edges, said guides being relatively movable laterally of the strip and biased toward continuous simultaneous engagement therewith, a stylus positionable in and out of engagement with said strip at said section, and a control member operatively related to said stylus and relatively movable guides, said control member having means for overcoming said bias and relatively positioning said guides to permit unrestrained lateral displacement of said strip section in one direction in the plane thereof and having means for simultaneously removing said stylus from its working position.

3. In sound recording and reproducing apparatus, an endless loop of a record film in strip form, means for continuously longitudinally advancing said record film including a driving roller engaging one surface of the film and an opposed displaceable pressure roller normally engaging the opposite surface thereof, a platen having a plane surface adapted to guide a section of the film normally thereof, lateral guide means for said film at said platen including a stationary guide adapted to engage one edge of the film and an opposed movable guide adapted normally to engage the opposite edge thereof, said stationary guide being discontinuous longitudinally of the film, means mounting said movable guide for displacement to a position clear of the plane of said platen surface, said movable guide being spring biased toward normal engagement with the film to restrain the film laterally between said two guides, a stylus positionable in and out of engagement with the record film at said platen, mechanism actuatable by notches in said film including a member adapted to engage said film at one of the discontinuities in the stationary guide, and a control member having cam surfaces arranged to displace said movable guide to a position clear of the plane of said platen and simultaneously disengage said pressure roller and stylus from the film, whereby said film may be readily inserted and removed and precisely guided during operation.

4. In sound recording and reproducing apparatus, a record medium in strip form, means for longitudinally advancing said strip including means causing a section of the strip at a selected location to advance in a plane, transducer means positionable in and out of cooperating relationship with said strip adjacent said location, guide means normally restraining lateral motion of the strip from said location, control means operable to move the transducer means out of said relationship with the strip and simultaneously to displace the guide means to a position removed from said location.

5. In sound recording and reproducing apparatus, an endless loop of a record medium in strip form, means for longitudinally advancing said strip including means causing a section of the strip at a selected location to advance in a plane, transducer means positionable in and out of cooperating relationship with said strip adjacent said location, guide means normally restraining lateral motion of the strip from said location, control means operable to move the transducer means out of said relationship with the strip and simultaneously to displace the guide means to a position removed from said location.

6. In sound recording and reproducing apparatus, a record medium in strip form, means for longitudinally advancing said strip including means causing a section of the strip at a selected location to advance in a plane, transducer means positionable in and out of cooperating relationship with said strip adjacent said location, guide means for restraining lateral motion of the strip from said location, means biasing the guide means to engagement with the edges of the strip at said location, and control means operable to move the transducer means out of said relationship with the strip and simultaneously to displace the movable guide means against the biasing means to a position of disengagement with the strip edges.

7. In sound recording and reproducing apparatus, a record medium in strip form, means for longitudinally advancing said strip including means causing a section of the strip at a selected location to advance in a plane, transducer means positionable in and out of cooperating relationship with said strip adjacent said location, a stationary guide adapted to engage an edge of the strip and extending longitudinally thereof at said location, an opposed movable guide spring-biased to engage the opposite edge of the strip at said location, and control means operable to move the transducer means out of said relationship with the strip and simultaneously to displace the movable guide to a position avoiding intersection with said plane, thereby to permit displacement of the strip relative to the stationary guide by lateral movement substantially within said plane, said control means including a rotatable cam shaft and cam means carried thereby operatively connected to actuate the transducer means and the guide.

THOMAS C. SMITH.
FREDERICK H. M. HART.
WILLIAM A. FREER.

REFERENCES CITED

The following references are of record in the file of this patent:

UNITED STATES PATENTS

| Number | Name | Date |
|---|---|---|
| 944,608 | Goodale | Dec. 28, 1909 |
| 1,437,895 | Horst | Dec. 5, 1922 |
| 1,604,389 | Cohn | Oct. 26, 1926 |
| 1,808,551 | Heisler | June 2, 1931 |
| 1,944,033 | Proctor | Jan. 16, 1934 |
| 1,954,808 | Foster et al. | Apr. 17, 1934 |
| 1,993,735 | Foster et al. | Mar. 12, 1935 |
| 2,051,787 | Foster | Aug. 18, 1936 |
| 2,065,383 | Lloyd | Dec. 22, 1936 |
| 2,066,041 | Kiel | Dec. 29, 1936 |
| 2,071,682 | Buccione | Feb. 23, 1937 |
| 2,105,741 | Kuhlik | Jan. 18, 1938 |
| 2,115,503 | Von Mihaly | Apr. 26, 1938 |
| 2,142,606 | Debrie | Jan. 3, 1939 |
| 2,152,296 | Weis et al. | Mar. 28, 1939 |
| 2,181,112 | Fries | Nov. 21, 1939 |
| 2,205,546 | Stechbart | June 25, 1940 |
| 2,229,924 | Howell | Jan. 28, 1941 |
| 2,259,715 | Woolf | Oct. 21, 1941 |
| 2,292,856 | Woolf et al. | Aug. 11, 1942 |
| 2,294,854 | Steed | Sept. 1, 1942 |
| 2,432,200 | Lasky et al. | Dec. 9, 1947 |

FOREIGN PATENTS

| Number | Country | Date |
|---|---|---|
| 269,140 | Great Britain | May 3, 1928 |
| 314,938 | Great Britain | 1930 |
| 196,406 | Switzerland | June 1, 1930 |